United States Patent [19]

Schneider et al.

[11] Patent Number: 5,214,915

[45] Date of Patent: Jun. 1, 1993

[54] METHOD AND ARRANGEMENT FOR SIMULATING THE DYNAMIC PERFORMANCE OF AN EXHAUST GAS CATALYZER

[75] Inventors: Erich Schneider, Kirchheim; Eberhard Schnaibel, Hemmingen, both of Fed. Rep. of Germany

[73] Assignee: Robert Bosch GmbH, Stuttgart, Fed. Rep. of Germany

[21] Appl. No.: 870,262

[22] Filed: Apr. 17, 1992

[30] Foreign Application Priority Data

Apr. 17, 1991 [DE] Fed. Rep. of Germany ....... 4112477

[51] Int. Cl.[5] .............................................. F01N 3/20
[52] U.S. Cl. ..................................... 60/274; 60/276; 60/277; 73/118.1
[58] Field of Search .................. 60/274, 276, 277; 73/118.1; 123/691

[56] References Cited

U.S. PATENT DOCUMENTS

| | | | |
|---|---|---|---|
| 3,962,866 | 6/1976 | Neidhard et al. | 60/277 |
| 4,622,809 | 11/1986 | Abthoff et al. | 60/277 |
| 5,077,970 | 1/1992 | Hamburg | 60/276 |

Primary Examiner—Douglas Hart
Attorney, Agent, or Firm—Walter Ottesen

[57] ABSTRACT

A method for simulating the time-dependent trace of the lambda value at the outlet of an exhaust gas catalyzer comprising measuring the air-mass flow inducted by the engine; computing the oxygen flow to the engine; determining the deviation $\Delta\lambda$ of the lambda value forward of the catalyzer, the deviation being positive for a lean mixture and negative for a rich mixture; computing the oxygen partial flow flowing into the catalyzer; inputting the oxygen-storage capacity thresholds of the catalyzer; computing the simulated time-dependent trace of the lambda value at the outlet of the catalyzer, and comparing the simulated and the actual lambda values for correction of the thresholds and for an indication of catalyzer deterioration.

6 Claims, 3 Drawing Sheets

5,214,915

METHOD AND ARRANGEMENT FOR SIMULATING THE DYNAMIC PERFORMANCE OF AN EXHAUST GAS CATALYZER

FIELD OF THE INVENTION

The invention relates to a method and an arrangement for simulating the trace of the lambda value as a function of time at the outlet of an exhaust gas catalyzer on a motor vehicle equipped with an internal combustion engine. The invention relates especially to a method and an arrangement for determining the converting capacity of the catalyzer with the aid of the simulated above-mentioned time-dependent trace.

BACKGROUND OF THE INVENTION

It has long been known that exhaust gas catalyzers convert toxic gases at a rate which decreases with increasing deterioration of the catalyzer. It has been shown that the signals of lambda probes mounted forward and rearward of the catalyzer, respectively, are suitable to determine the converting capacity of the catalyzer. In U.S. Pat. No. 3,962,866, the difference of the two above-mentioned probes is formed. When the difference drops below a threshold value, a warning signal is emitted which indicates that the catalyzer should be exchanged. In U.S. Pat. No. 4,622,809, a corresponding warning signal is provided when the amplitude of the signal of the probe rearward of the catalyzer exceeds a threshold value or the mean value leaves a pregiven range even though an effort is made to control to a minimum amplitude and to maintain the range. For this purpose, control parameters are changed in dependence upon the signal from the probe rearward of the catalyzer.

It is apparent that the signals of the probe rearward of the catalyzer are not only dependent upon the state of deterioration of the catalyzer but are also dependent upon the amplitude and upon the time-dependent trace of the signal of the probe forward of the catalyzer, that is, from the oxygen quantity which flows into the catalyzer or the oxygen quantity taken from the catalyzer. For precise data of the conversion capacity of a catalyzer, it is therefore necessary to optimize the conditions for the probe signals at which the catalyzer is judged to be no longer useable.

For optimization problems, it is well known that it is helpful if the system to be optimized can be simulated. In this way, many different time sequences can be investigated using computer techniques without complex experiments being necessary.

SUMMARY OF THE INVENTION

In view of the foregoing, it is an object of the invention to provide a method and an arrangement for simulating the time-dependent performance of an exhaust gas catalyzer.

The method according to the invention is for simulating the time-dependent trace of the lambda value $\lambda\_H\_SIM$ at the outlet of an exhaust gas catalyzer in a motor vehicle equipped with an internal combustion engine and includes the steps of: measuring the air-mass flow $QS\_L\_AS$ inducted by the engine; computing the oxygen flow inducted by the engine as $QS\_O_2\_AS = k \times QS\_L\_AS$ wherein k is the mass part of oxygen in air; determining the deviation $\Delta\lambda$ of the lambda value forward of the catalyzer from the lambda value one, the deviation being positive in the case of a lean mixture and, the deviation being negative in the case of a rich mixture; computing the oxygen partial flow $QS\_O_2\_IN = \Delta\lambda \times QS\_O_2\_AS$ flowing from the engine into the catalyzer, the oxygen partial flow being a charging flow with respect to the action of the catalyzer in the case of positive values of $\Delta\lambda$ and, the oxygen partial flow being a depletion flow with respect to the action of the catalyzer in the case of negative values; inputting the oxygen-storage capacity $SPV\_O_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold; and, computing the time-dependent trace of the lambda value $\lambda\_H\_SIM$ at the outlet of the catalyzer by setting the lambda value to one as long as the oxygen store is in a charging state below the overflow threshold or is in a depletion state above a depletion threshold, the depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold.

The arrangement according to the invention for simulating the time-dependent trace of the lambda value includes means for carrying out the above-mentioned steps.

The method and the arrangement of the invention utilize a model with respect to the time-dependent performance of oxygen partial flows which is explained in greater detail below. It is advantageous to consider additional operations with time-dependent transition responses when exceeding the above-mentioned thresholds. This is the subject matter of advantageous further embodiments of the method of the invention.

The method of the invention can be very reliably used for determining the loss of performance (state of deterioration) of an exhaust gas catalyzer. This is done in that the lambda values, which are computed with the aid of the simulation model of the invention, are compared to actual values measured at the outlet of the exhaust gas catalyzer. The storage capacity of the catalyzer used in the model is changed until the simulated values correspond to the measured values in mean time. The storage capacity determined in this manner is used as a measure for the performance loss of the catalyzer.

The arrangement of the invention is for simulating the time-dependent trace of the lambda value $\lambda\_H\_SIM$ at the outlet of an exhaust gas catalyzer in a motor vehicle having an internal combustion engine. The arrangement includes: a measuring device for measuring the air mass flow $QS\_L\_AS$ inducted by the engine; first computation means for computing the air mass flow inducted by the engine as $QS\_O_2\_AS = k \times QS\_L\_AS$ wherein k is the component of oxygen in air; means for determining the deviation $\Delta\lambda$ of the lambda value forward of the catalyzer from the lambda value one, the deviative $\Delta\lambda$ being positive when the mixture is lean and the deviative $\Delta\lambda$ being negative when the mixture is rich; second computation means for computing the oxygen partial flow $QS\_O_2\_IN = \Delta\lambda \times QS\_O_2\_AS$ flowing from the engine into the catalyzer, the oxygen partial flow being a charging flow with respect to the action of the catalyzer in the case of positive values of $\Delta\lambda$ and, the oxygen partial flow being a depletion flow with respect to the action of the catalyzer in the case of negative values; means for inputting the oxygen storage capacity SPV_O$_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold; and, third computation means for computing the time-dependent trace of the lambda value $\lambda$_H_SIM at the outlet of the catalyzer by setting the lambda value to one as long as the oxygen store is in a charging state below the overflow threshold or is in a depletion state above a depletion threshold, the depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
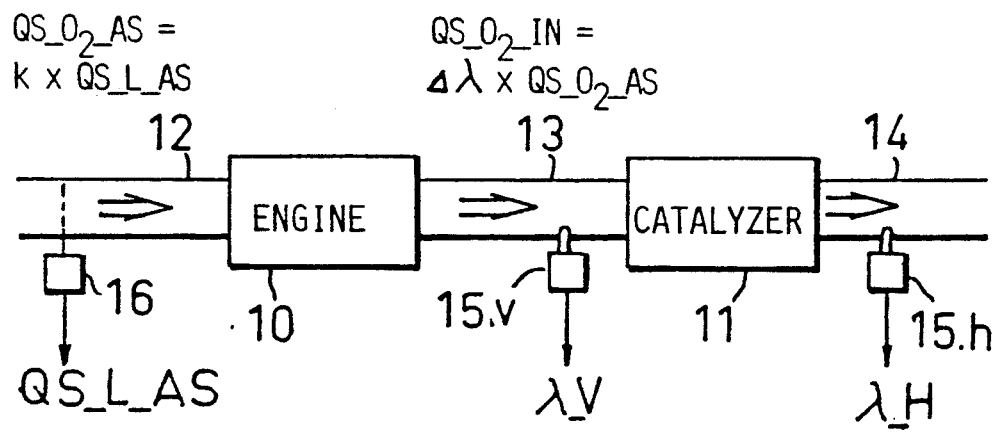
FIG. 1 is a schematic showing the gas flows through an engine and a catalyzer.

FIG. 1 shows schematically an engine 10 and a catalyzer 11 and gas-conducting pipes associated therewith. An intake pipe 12 leads into the engine 10. The engine 10 and the catalyzer 11 are interconnected via a pipe which is identified as an inlet pipe 13 because, in the following, the gas flows are especially significant which enter into the catalyzer 11 and which exit therefrom. The exiting gas flows leave the catalyzer via an outlet pipe 14. A forward lambda probe 15.$v$ is mounted in the inlet pipe 13 forward of the catalyzer 11 and measures the lambda value $\lambda$_V. A further lambda probe 15.$h$ is mounted rearward of the catalyzer in the outlet pipe 14 and measures a lambda value $\lambda$H_ACT. An air-flow sensor 16 is mounted in the intake pipe 12.

The air-flow sensor measures the air-mass flow QS_L_AS inducted by the engine 10. From this air-mass flow, the inducted oxygen flow QS_O$_2$_AS is computed to be k×QS_L_AS. Here, (k) is the proportion of oxygen in air and is constant approximately 21 mol percent up to high elevations. Whether a net volume of oxygen still flows out of the engine is dependent upon the lambda value to which the engine is controlled. If the lambda value is greater than one, a lean mixture is supplied to the engine and the engine supplies a net volume of oxygen which can be stored in the catalyzer 11. On the other hand, if the engine is controlled to a lambda value less than one, then the engine emits gas components which can still be oxidized and which can consume oxygen in the catalyzer 11 in the event that such oxygen is still stored. The deviation of the lambda value to that to which the engine is controlled from a lambda value one is referred to in the following as $\Delta\lambda$. This value should not be confused with the lambda control deviation.

If the engine is controlled to a desired value of 1.01, and if this desired value is actually reached, then the control deviation is zero. The value $\Delta\lambda$ of interest in the following is however 0.01. This value together with the inducted oxygen mass flow fixes the oxygen partial flow QS_O$_2$_IN as it flows into the catalyzer. Here, QS_O$_2$_IN = $\Delta\lambda$×QS_O$_2$_AS. In the case of positive values of $\Delta\lambda$, this partial flow is an oxygen supply flow and, in the case of negative values, an oxygen removal flow which takes oxygen from the catalyzer as long as oxygen is stored there. Because of the storage performance of the catalyzer, a lambda value $\lambda$_H_ACT adjusts at the output of the catalyzer with this lambda value not coinciding in its time-dependent trace with that value of lambda $\lambda$_V at the input of the catalyzer.

Figure 2:
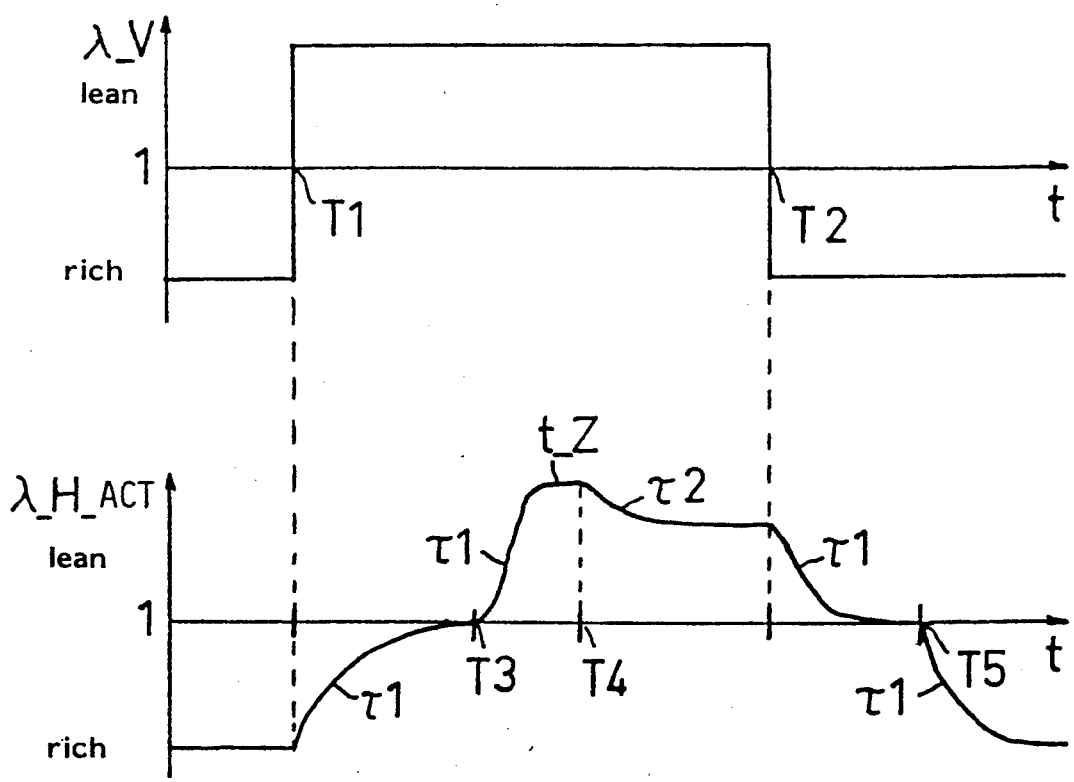
FIG. 2 shows the time-dependent trace of the lambda value at the outlet of an exhaust gas catalyzer.

The time-dependent trace of the just-mentioned lambda values is shown in FIG. 2. Here, the upper part of FIG. 2 shows the trace of the lambda value $\lambda$_V forward of the catalyzer 11. At a time point T1, this lambda value abruptly shifts from rich to lean. The reverse takes place at a time point T2 with an abrupt change from lean to rich.

In the lower part of FIG. 2, the time-dependent trace of $\lambda$_H_ACT is shown. Before time point T1, the value of this signal corresponds to that value of $\lambda$_V since in FIG. 2, the assumption was made that in advance of time point T1, the catalyzer 11 was supplied over a longer time with exhaust gas from a rich combustion. Then, the catalyzer no longer stores any oxygen so that the catalyzer cannot convert oxidizable toxic gas components. Accordingly, the catalyzer permits the exhaust gas to pass essentially unchanged and for this reason signal as the forward lambda probe 15.$v$. However, as soon as the catalyzer at time point T1 is supplied from a lean combustion, the catalyzer converts the oxidizable toxic substances contained in the exhaust gas and stores surplus oxygen. Then, a signal adjusts at its output which corresponds to the lambda value one. As soon as the catalyzer has exhausted its maximum storage capacity of oxygen, which is the case approximately starting at a time point T3, oxygen in increasing quantities appears at the output of the catalyzer and, for this reason, also the probe rearward of the catalyzer also indicates a lean mixture. However, it should be noted that the increase from the lambda value to a lambda value for lean combustion is not sudden; instead, this takes place with a transition of the second order. That state of the catalyzer at which the increase in oxygen at its output becomes noticeable, is noted as the overflow state. The state in which the catalyzer is completely saturated with oxygen is, in contrast, identified as the saturation state. The quantity of oxygen which the catalyzer can store in its saturated state is dependent upon its performance loss (state of deterioration) but also upon the partial pressure of the oxygen. Accordingly, the catalyzer, when practically only air is supplied thereto (as is the case for a time in overrun operation), can store 1.5 to two times the quantity of oxygen as in the usual combustion operation of the engine 10. In the usual combustion operation, the capacity for storage is quite independent of whether, for example, a lambda value of 1.01 or 1.1 is adjusted. This only has influence on the time duration which passes until the catalyzer reaches the saturation state from the completely depleted state.

For simplicity, only methods are described in the following which are carried out during the combustion operation of the engine or are simulated, that is, for a storage capacity of the catalyzer which remains approximately the same, but not in overrun operation without fuel being supplied. If this condition is considered, then further time transitions between the different storage states of the catalyzer should be noted.

In the above, it was noted that the lambda value measured rearward of the catalyzer corresponds to the lambda value measured forward of the catalyzer when the saturation state of the catalyzer was reached. This condition applies permanently however only for a new catalyzer. For a deteriorated catalyzer, the lambda value measured rearward of the catalyzer becomes less after a delay time of several 10 milliseconds by a value dependent upon the performance loss (state of deterioration). This reduction is shown in FIG. 2 starting at time point T4. The effect is also described in copending U.S. patent application Ser. No. 806,309, filed on Dec. 13, 1991.

After the switchover from lean to rich combustion operation at time point T2, oxidizable exhaust gas components in excess enter the catalyzer 11. These exhaust gas components are there oxidized by the oxygen which is still stored and, for this reason, the lambda value one again adjusts at the output of the catalyzer. If the oxygen content of the catalyzer is completely depleted, exhaust gas flows essentially unchanged through the catalyzer again as described at the beginning of this sequence and, for this reason, the same signal is measured rearward of the catalyzer as forward of the catalyzer. This transition however does not take place abruptly in correspondence to the transition from the overflow state to the saturation state; instead, it is a transition of the second order from a depletion state into the empty state. In FIG. 2, this transition takes place noticeably starting at time point T5.

In FIG. 2, time constants $\tau 1$ and $\tau 2$ are shown. $\tau 1$ is an indication as to the time-dependent trace of the following transitions: transition from empty state (rich) to one (charging state) from time point T1 on; transition from one (overflow state) to lean (saturation state) from time point T3 on; transition from lean to one from time point T2 on; transition from one (depletion state) to rich (empty state) from time point T5 on. All these transitions are essentially transitions of the second order, that is, they have to be defined by two time constants. The four transitions do not correspond precisely to each other with respect to their time-dependent behavior. However, for the purpose of simulation, it has been shown adequate when the transitions are all treated the same with the delay time constants and the transient time constants of several milliseconds to several 10 milliseconds.

As indicated above, the lambda value measured rearward of the catalyzer corresponds to the lambda value forward of the catalyzer after reaching the saturation state only temporarily. This delay time is identified in FIG. 2 with t_z forward of the time point T4. The decay time constant is noted with $\tau 2$ and amounts typically to several 10 milliseconds. The delay time t_Z as well as the time constant $\tau 2$ are dependent upon the performance loss of the catalyzer.

Figure 3:
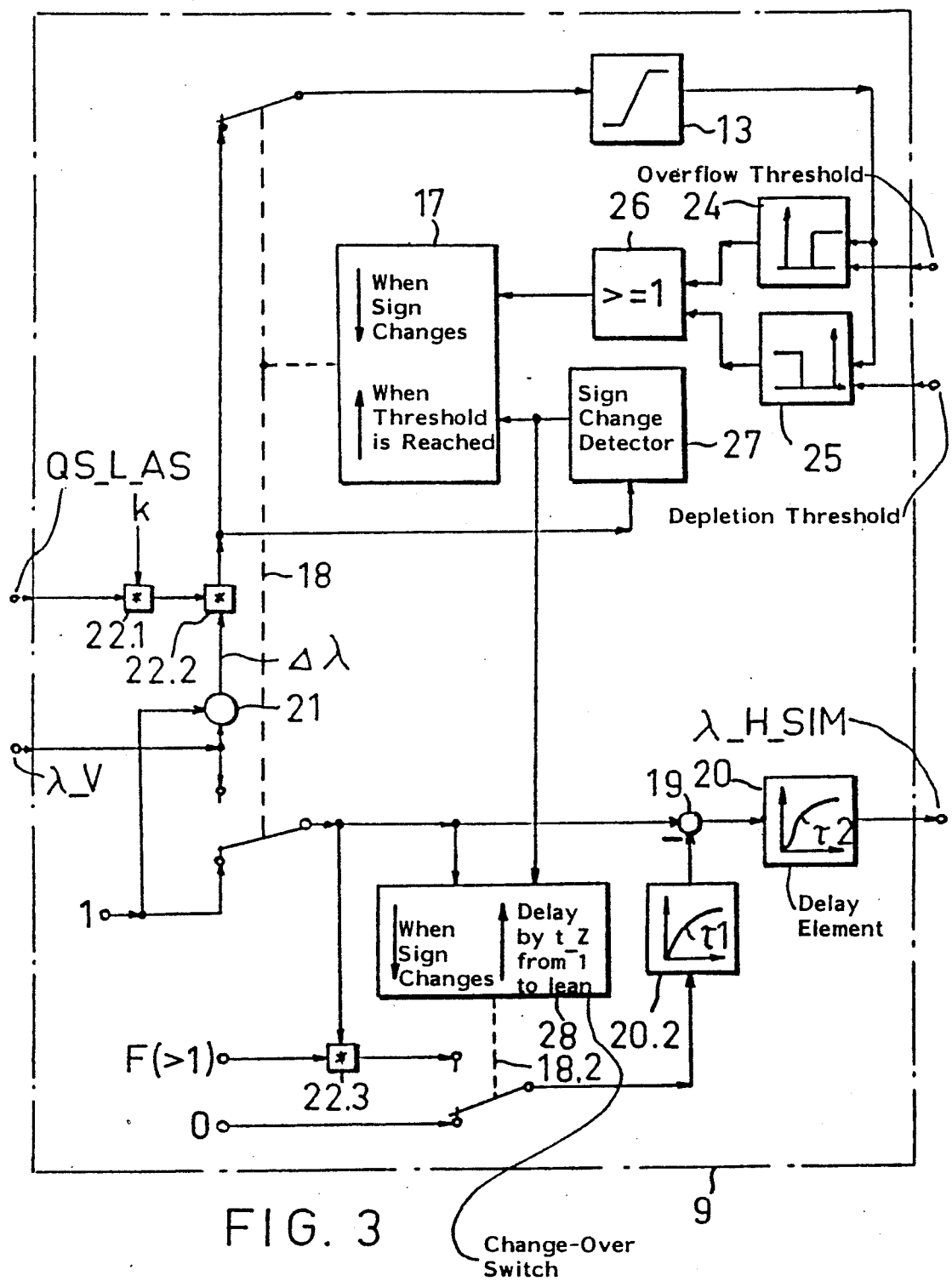
FIG. 3 is a block diagram for explaining an embodiment of the method and an embodiment of the arrangement of the invention for simulating the time-dependent trace of the lambda value at the outlet of an exhaust gas catalyzer.

FIG. 3 shows a simulation model for reconstructing the time-dependent trace of $\lambda\_H\_ACT$ as it is shown in FIG. 2 as $\lambda\_H\_SIM$. Input variables of the model are the inducted air mass QS_L_AS, the lambda value $\lambda\_V$ forward of the catalyzer as well as input values for the overflow threshold and the depletion threshold. The output variable is the simulation value $\lambda\_H\_SIM$ for the lambda value rearward or the catalyzer.

The switchover between the input variable $\lambda\_V$ and a lambda value 1 prepared within the model occurs in dependence upon the signal of a storage state evaluation unit 17 by means of a change-over switch 18. From each signal transmitted further, a value is subtracted as required in a subtraction location 19 starting at a time point corresponding to the time point T4 in FIG. 2. In a transition unit 20, he time trace of the second order explained above is superposed on the signal which is indicated by the time constant $\tau 1$. The signal processed in this manner is the output value $\lambda\_H\_SIM$. In which way the change-over switch 18 is actuated and how a decision is made when a signal is to be subtracted in the subtraction unit 19 is described in the following.

The block circuit diagram of FIG. 3 includes in coaction with the storage state evaluation unit 17 also the following function means: a summation unit 21, a first multiplier 22.1, a second multiplier 22.2, a storage integrator 23, an overflow threshold comparator 24, a depletion threshold comparator 25, an OR-element 26 and a sign change detector 27.

In the first multiplier 22.1, the product k×QS_L_AS is formed in order to obtain QS_O_2_AS. This value is multiplied in the second multiplier 22.2 by a value $\Delta\lambda$ in order to form QS_O_2_IN. $\Delta\lambda$ is formed in the summation unit 21 as difference $\lambda\_V-1$.

It is assumed that the value $\lambda\_V$ has just jumped from rich to lean, that is, the state corresponding to time point T1 in FIG. 2 is present. Accordingly, a switchover took place to the lambda value one and this value is obtained delayed in time by the transition unit 20 as the output value of $\lambda\_H\_SIM$. The value of $\Delta\lambda$ is then positive which leads to the condition that the storage integrator 23 integrates to ever higher values until the comparator 24 determines that the overflow threshold is reached. The comparator emits a signal via the OR-element 26 that indicates this occurrence to the storage state evaluation unit 17 which, in this case, switches over the change-over switch 18 which leads to the condition that the storage integrator 23 remains constant at its actual value and that a switchover takes place from lambda value one to the value $\lambda\_V$. This value is then, in turn, delayed by the transition unit 20 and is emitted as signal $\lambda\_H\_SIM$. This corresponds to the transition starting at time point T3. With the switchover, the time span t_Z is also stated.

For supplying a signal to be subtracted from the subtraction unit 19, the arrangement of FIG. 3 includes the following function groups: a third multiplier 22.3, a change-over unit 28 and a second transition unit 20.2. The change-over unit 28 receives a signal from a sign-change detector 27 with each change of the sign of $\Delta\lambda$, and furthermore, receives the lambda value conducted by the change-over switch 18. As soon as the change-over unit 28 determines based on the last-mentioned feature, that the lambda value one has been switched over to a lambda value for lean combustion, the change-over unit 28 switches a change-over switch 18.2 so that the switch 18.2 emits a special multiplication value to the second transition unit 202 with the time response $\tau 2$ in lieu of the value zero. The output signal of this second transition unit 20.2 is subtracted in the subtraction unit 19 from the lambda output signal from the change-over switch 18. The special multiplication value is generated in the third multipier unit 22.3 by multiplication of the above-mentioned lambda value from the change-over switch 18 by a factor F. This factor is zero for a new catalyzer; however, it then takes on increasingly greater positive values which however never become greater than one. In a preferred embodiment, the magnitude of the factor is dependent upon the difference between the overflow threshold and the depletion threshold which can be changed in time to correspond to the performance state of the catalyzer.

It is noted that the above-mentioned switchover of the change-over switch 18.2 occurs only delayed by the time span t_Z after the jump from one to lean. Only for this transition, a signal not equal to zero is transmitted to the second transition unit 20.2 and therefore to the subtraction unit 19. With the next change in sign, as it is announced from the sign-change detector 27, a switchover to zero again takes place.

In the foregoing, the sequence up to a time point corresponding to the time point T2 in FIG. 2 is described. At this time point, the lambda value $\lambda\_V$ changes from lean to rich. The corresponding sign change of $\Delta\lambda$ is determined by the sign-change detector 27, which then, as already mentioned, switches the second change-over switch 18.2 again to the value zero and, furthermore, switches over the storage state evaluation unit 17 so that this unit again switches the first change-over switch 18 so that switch 18, on the one hand, emits the lambda value one and, on the other hand, again supplies the storage integrator 23 with the value QS_O$_2$_IN. With the switchover to the lambda value one, the output value $\lambda\_H\_SIM$ drops with the time trace superposed by the first transition unit 20 likewise to the value one as shown from time point T2 on in FIG. 2. The storage integrator 23 simultaneously integrates to smaller values since $\Delta\lambda$ and therefore QS_O$_2$_IN is negative. As soon as the depletion threshold comparator 25 determines that there is a drop below the depletion threshold, the corresponding signal is transmitted via the OR-element 26 to the storage state evaluation unit 17, which then again so switches the change-over switch 18 that the storage integrator 23 ends its work and the lambda value $\lambda\_V$ is provided to the output via the subtraction unit 19 and the first delay unit 20. In this way, the output signal $\lambda\_H\_SIM$ drops with the time trace $\tau 1$ to the input value $\lambda\_V$. Accordingly, the transition starting at a time point corresponding to the time point T5 in FIG. 2 takes place.

Figure 4:
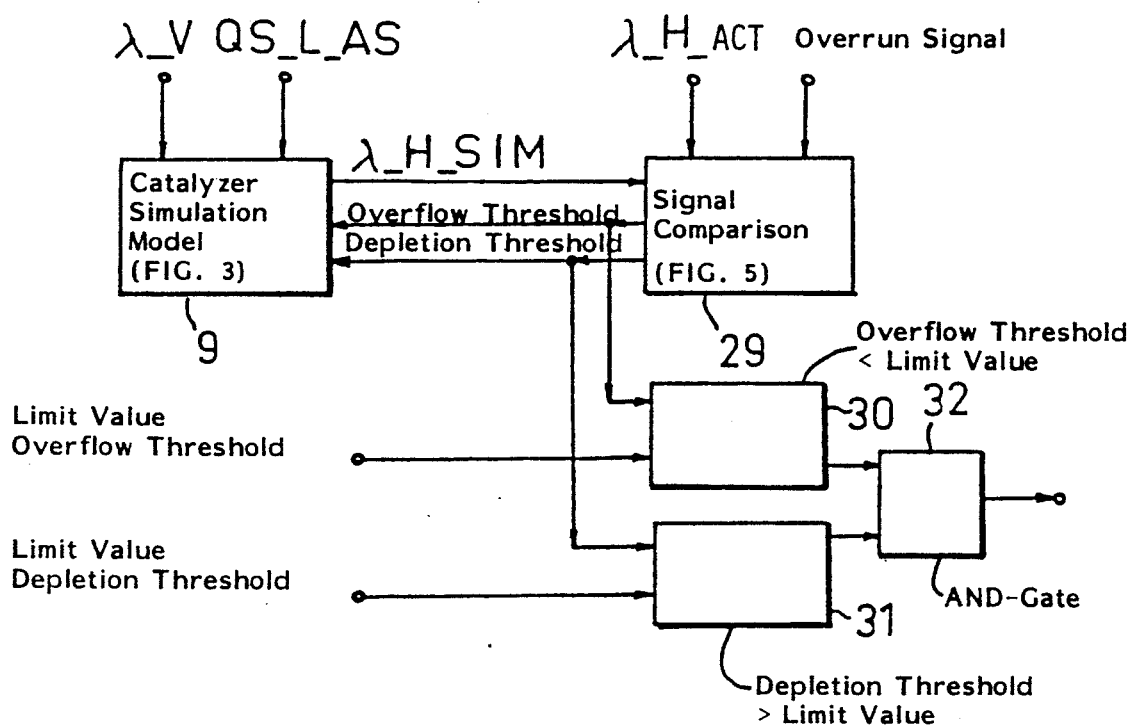
FIG. 4 is a block circuit diagram for explaining an embodiment of the method of the invention and an arrangement of the invention for determining the performance loss of a catalyzer; and, FIG. 5 is a block circuit diagram for explaining a signal comparison unit in the block circuit diagram or FIG. 4.

FIG. 4 shows how, with the aid of this simulation arrangement, the storage capacity and therefore the state of deterioration of a catalyzer can be determined.

Figure 5:
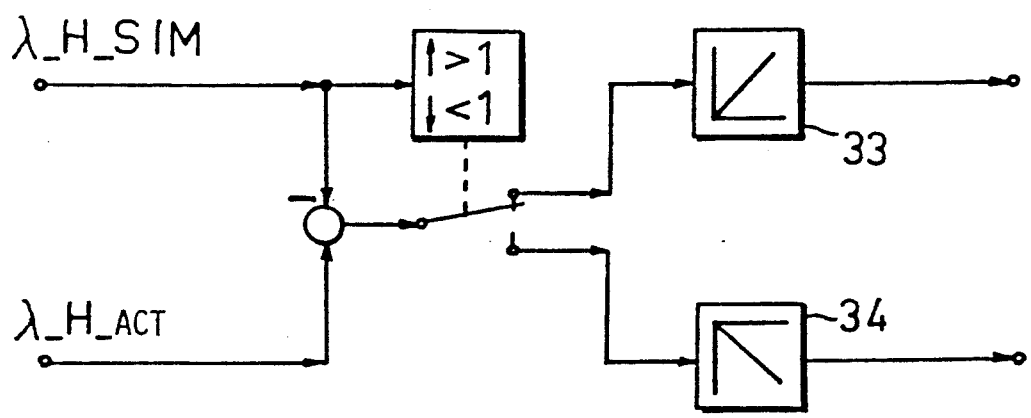

The block circuit diagram of FIG. 4 includes the simulation model arrangement 9 according to FIG. 3, a signal-comparison unit 29 which is shown with greater clarity in FIG. 5, an overflow threshold limit value comparator 30, a depletion threshold limit-value comparator 31 as well as an AND-element 32.

The simulation arrangement 9 receives the lambda value $\lambda\_V$ from the forward lambda probe 15.$\nu$ shown in FIG. 1 and the value QS_L_AS from the air-flow sensor 16 likewise shown in FIG. 1 and the values for the overflow threshold and the depletion threshold from the signal comparator unit 29. The simulation arrangement 9 supplies its output signal $\lambda\_H\_SIM$ to the signal-comparator unit 29 where it is compared to the lambda value $\lambda\_H\_ACT$ as it is emitted by the rearward lambda probe 15.$h$ shown in FIG. 1. The signal-comparator unit 29 shifts the values for the overflow threshold and the depletion threshold until the time trace of $\lambda\_H\_SIM$ corresponds essentially to the time-dependent trace of $\lambda\_H\_ACT$. The older the catalyzer is, the lower is the overflow threshold and the higher the depletion threshold. The difference between these values is directly proportional to the storage performance of the catalyzer.

The arrangement of FIG. 4 however, does not evaluate this difference directly; instead, this arrangement emits an error signal when the overflow threshold limit-value comparator 30 determines that the overflow threshold drops below an overflow threshold it value and, simultaneously, the depletion threshold limit-value comparator: 31 determines that the depletion threshold has increased above a depletion threshold limit value. The simultaneous satisfaction of both requirements is determined with the aid of AND-element 32 having an output signal which is accordingly an error signal and indicates that the catalyzer has become unuseable.

At this point, it is noted that the depletion threshold seen physically must have a value which continuously is essentially the same magnitude and must lie closely to zero since this value indicates when the oxygen quantity stored in the catalyzer has been almost consumed. In the simulation arrangement 9 of FIG. 3, it is however the case that the storage integrator 23 must not necessarily run from zero when the catalyzer begins to store oxygen. The actual values of the overflow threshold and the depletion threshold depend thus on the output state of the storage integrator 23. The difference between the two values is however independent of the absolute position of the values. The absolute position of the values is however to be considered when fixing the overflow threshold limit value and the depletion threshold limit value for the comparators 30 and 31.

FIG. 5 shows how the signal comparator unit 29 is configured and operates. This unit includes an overflow threshold integrator 33 and a depletion threshold integrator 34. Both integrate the difference signal $\lambda\_H\_SIM-\lambda\_ACT$ with however the overflow threshold integrator 33 however only then integrating when $\lambda\_H\_SIM$ is greater than one and the depletion threshold integrator 34 only then integrating when the above-mentioned value is less than one. If, for example, the lambda value $\lambda\_V$ at the input of the catalyzer is 1.02 and if the value $\lambda\_H\_SIM$ jumps earlier than the value $\lambda\_ACT$ from 1 to 1.02 because the overflow threshold is too low, the overflow threshold integrator 23 integrates to higher values and for so long until $\lambda\_H\_SIM$ - shows essentially simultaneously with $\lambda\_ACT$ the transition from lambda value one to lean lambda values. If in contrast, $\lambda\_V$ is for example 0.98 and if the value $\lambda\_H\_SIM$ shows the transition from 1 to 0.98 earlier than the value $\lambda\_ACT$, then the difference value $-0.02$ is integrated. The depletion threshold is thereby reduced until essentially the time-dependent trace of $\lambda\_H\_SIM$ corresponds with that of $\lambda\_ACT$.

For each catalyzer type, the time constants for the transition curves are to be determined separately. If the time constants are dependent on the performance loss, then this method too is to be determined individually. In the practical operation of the model, the particular state of deterioration can be determined with the aid of the difference between the overflow threshold and the depletion threshold in order to again modify the time constants, especially the time constant $\tau 2$, and also the delay time duration $t\_Z$. The model according to FIG. 4 for automatically adjusting the overflow threshold and the depletion threshold can be further improved in that also transition time constants and the above-mentioned delay time are optimized. However, it has been shown that this is not necessary for the realistic simulation of the time-dependent trace of the lambda value at the outlet of the exhaust gas catalyzer.

It is understood that the foregoing description is that of the preferred embodiments of the invention and that various changes and modifications may be made thereto without departing from the spirit and scope of the invention as defined in the appended claims.

What is claimed is:

1. A method for simulating the time-dependent trace of the lambda value $\lambda\_H\_SIM$ at the outlet of an exhaust gas catalyzer in a motor vehicle equipped with an internal combustion engine, the method comprising the steps of:

measuring the air-mass flow $QS\_L\_AS$ inducted by the engine;

computing the oxygen flow inducted by the engine as $QS\_O_2\_AS = k \times QS\_L\_AS$ wherein k is the mass part of oxygen in air;

determining the deviative $\Delta\lambda$ of the lambda value forward of the catalyzer from the lambda value one, said deviation being positive in the case of a lean mixture and said deviation being negative in the case of a rich mixture;

computing the oxygen partial flow $QS\_O_2\_IN = \Delta\lambda \times QS\_O_2\_AS$ flowing from the engine into the catalyzer, said oxygen partial flow being a charging flow with respect to the action of the catalyzer in the case of positive values of $\Delta\lambda$ and, said oxygen partial flow being a depletion flow with respect to the action of the catalyzer in the case of negative values of $\Delta\lambda$;

inputting the oxygen-storage capacity $SPV\_O_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold; and, computing the time-dependent trace of the lambda value $\lambda\_H\_SIM$ at the outlet of the catalyzer by setting the lambda value to one as long as the oxygen store is in a charging state below the overflow threshold or is in a depletion state above a depletion threshold, said depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold.

2. The method of claim 1, wherein a transition of a second order is pregiven from the overflow state to the saturation state of the catalyzer or from the depletion state to the empty state of the catalyzer; and, said simulated lambda value $\lambda\_H\_SIM$ is set to the lambda value $\lambda\_V$ at the input of the catalyzer while considering this transition.

3. The method of claim 1, wherein said lambda value $\lambda\_H\_SIM$ is at the output of the catalyzer and said lambda value $\lambda\_SIM$ at the output of the catalyzer is reduced with respect to the value $\lambda\_V$ by a value $F \times \lambda\_V$ after a value of a magnitude one is reached after a delay time span $t\_Z$ has run; and, wherein the quantities $t\_Z$ and $F$ are dependent from the difference between the overflow state and the depletion state.

4. A method for determining the performance loss of an exhaust gas catalyzer in a motor vehicle equipped with an internal combustion engine, the method comprising the steps of:

measuring the air-mass flow $QS\_L\_AS$ inducted by the engine;

computing the oxygen flow inducted by the engine as $QS\_O_2\_AS = K \times QS\_L\_AS$ wherein k is the mass part of oxygen in air;

determining the deviation $\Delta\lambda$ of the lambda value forward of the catalyzer from the lambda value one, said deviation being positive in the case of a lean mixture and said deviation being negative in the case of a rich mixture;

computing the oxygen partial flow $QS\_O_2\_IN = \Delta\lambda \times QS\_O_2\_AS$ flowing from the engine into the catalyzer, said oxygen partial flow being a charging flow with respect to the action of the catalyzer in the case of positive values of $\Delta\lambda$ and, said oxygen partial flow being a depletion flow with respect to the action of the catalyzer in the case of negative values of $\Delta\lambda$ inputting the oxygen-storage capacity $SPV\_O_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold;

computing the time-dependent trace of the lambda value $\lambda\_H\_SIM$ at the outlet of the catalyzer by setting the lambda value to one as long as the oxygen store is in a charging state below the overflow threshold or is in a depletion state above a depletion threshold, said depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold;

measuring the actual lambda value $\lambda_{13}$ ACT at the output of the catalyzer; and, changing the storage capacity $SPV\_O_2$ so long until the lambda value $\lambda\_H\_SIM$ in time average corresponds to the measured lambda value $\lambda\_H\_ACT$ and using the storage Lcapacity $SPV\_O_2$ as a measure of the performance loss of the catalyzer.

5. An arrangement for simulating the time-dependent trace of the lambda value $\lambda\_H\_SIM$ at the outlet of an exhaust gas catalyzer in a motor vehicle having an internal combustion engine, the arrangement comprising:

a measuring device for measuring the air-mass flow $QS\_L\_AS$ inducted by the engine;

first computation means for computing the air-mass flow inducted by the engine as $QS\_O_2\_AS = k \times QS\_L\_AS$ wherein k is the component of oxygen in air;

means for determining the deviative $\Delta\lambda$ of the lambda value forward of the catalyzer from the lambda value one, said deviative $\Delta\lambda$ being positive when the mixture is lean and said dervative $\Delta\lambda$ being negative when said mixture is rich;

second computation means for computing the oxygen partial flow $QS\_O_2\_IN = \Delta\lambda \times QS\_O_2\_AS$ flowing from the engine into the catalyzer, said oxygen partial flow being a charging flow with respect to the action of the catalyzer in the case of positive values of $\Delta\lambda$ and, said oxygen partial flow being a depletion flow with respect to the action of the catalyzer in the case of negative values of $\Delta\lambda$;

means for inputting the oxygen storage capacity $SPV\_O_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold; and, third computation means for computing the time-dependent trace of the lambda value $\lambda\_H\_SIM$ at the outlet of the catalyzer by setting the lambda value to one as long as the oxygen store is in a charging state below the overflow threshold or is in a depletion state above a depletion threshold, said depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold.

6. An arrangement for determining the performance exhaust gas catalyzer in a motor vehicle equipped with an internal combustion engine, the arrangement comprising:

a probe for measuring the lambda value $\lambda\_H\_ACT$ at the output of the catalyzer;

a simulating arrangement for simulating the time-dependent trace of the lambda value $\lambda\_H\_SIM$ at the outlet of the catalyzer and for defining a simulation model, the simulating arrangement including:

a measuring device for measuring the air-mass flow $QS\_L\_AS$ inducted by the engine;

first computation means for computing the air-mass flow inducted by the engine as $QS\_O_2\_AS = k \times QS\_L\_AS$ wherein k is the component of oxygen in air;

means for determining the derivative $\Delta\lambda$ of the lambda value forward of the catalyzer from the lambda value one, said deviation $\Delta\lambda$ being positive when the mixture is lean and said deviation $\Delta\lambda$ being negative when said mixture is rich;

second computation means for computing the oxygen partial flowing $QS\_O_2\_IN = \Delta\lambda \times QS\_O_2\_AS$ from the engine into the catalyzer, said oxygen partial flow being a charging flow with respect to the action of the catalyzer in the case of positive values of $\Delta\lambda$ and, said oxygen partial flow being a depletion flow with respect to the action of the catalyzer in the case of negative values of $\Delta\lambda$;

means for inputting the oxygen storage capacity $SPV\_O_2$ of the catalyzer as an oxygen quantity which the catalyzer can take up starting from an oxygen-free state up to an overflow threshold for a continuous charging flow while the gas flowing out through the outlet of the catalyzer has an oxygen concentration which exceeds a pregiven threshold;

third computation means for computing the time-dependent trace of the lambda value $\lambda\_H\_SIM$ at the outlet of the catalyzer by setting the lambda value to one as long as the oxygen store is in a charging state below the overflow threshold or is in a depletion state above a depletion threshold, said depletion threshold corresponding to a pregiven low oxygen concentration at the outlet of the catalyzer; or, at least temporarily setting the lambda value to the lambda value at the inlet of the catalyzer when the overflow threshold value is exceeded or there is a drop below the depletion threshold; and, means for changing said storage capacity $SPV\_O_2$ simulation model defined by said simulating arrangement so long until the lambda value of said simulation model in time average corresponds to the measured lambda value $\lambda\_H\_ACT$ and for using said storage capacity $SPV\_O_2$ as a measure of the performance loss of the catalyzer.

* * * * *

UNITED STATES PATENT AND TRADEMARK OFFICE
CERTIFICATE OF CORRECTION

PATENT NO. : 5,214,915  
DATED : June 1, 1993  
INVENTOR(S) : Erich Schneider and Eberhard Schnaibel Page 1 of 5

It is certified that error appears in the above-identified patent and that said Letters Patent is hereby corrected as shown below:

In column 2, line 57: delete "$QS_{-O2-}AS$" and substitute -- $QS\_O_2\_AS$ -- therefor.

In column 2, line 61: delete "deviative" and substitute -- deviation -- therefor.

In column 2, line 62: delete "deviative" and substitute -- deviation -- therefor.

In column 2, line 64: delete "$QS_{-O2-}IN$" and substitute -- $QS\_O_2\_IN$ -- therefor.

In column 3, line 39: delete "or" and substitute -- of -- therefor.

In column 3, line 56: delete "$\lambda H\_ACT$" and substitute -- $\lambda\_H\_ACT$ -- therefor.

In column 4, line 42: between "reason" and "signal", insert -- the rearward lambda probe 15.h measures essentially the same --.

UNITED STATES PATENT AND TRADEMARK OFFICE
CERTIFICATE OF CORRECTION

PATENT NO. : 5,214,915
DATED : June 1, 1993
INVENTOR(S) : Erich Schneider and Eberhard Schnaibel It is certified that error appears in the above-identified patent and that said Letters Patent is hereby corrected as shown below:

In column 5, line 66: delete "$t\_z$" and substitute -- $t\_Z$ -- therefor.

In column 6, line 10: delete "or" and substitute -- of -- therefor.

In column 6, line 18: delete "he" and substitute -- the -- therefor.

In column 6, line 31: delete "sign change" and substitute -- sign-change -- therefor.

In column 6, line 36: delete "$\lambda\_{-V-}1$" and substitute -- $\lambda\_V - 1$ -- therefor.

In column 6, line 56: delete "stated" and substitute -- started -- therefor.

In column 7, line 2: delete "202" and substitute -- 20.2 -- therefor.

UNITED STATES PATENT AND TRADEMARK OFFICE
CERTIFICATE OF CORRECTION

PATENT NO. : 5,214,915
DATED : June 1, 1993
INVENTOR(S) : Erich Schneider and Eberhard Schnaibel It is certified that error appears in the above-identified patent and that said Letters Patent is hereby corrected as shown below:

In column 7, line 36: delete "nand" and substitute -- hand -- therefor.

In column 8, line 18: delete "it" and substitute -- limit -- therefor.

In column 8, line 20: delete "comparator: 31" and substitute -- comparator 31 -- therefor.

In column 8, line 46: delete "however".

In column 9, line 30: delete "deviative" and substitute -- deviation -- therefor.

In column 10, line 3: delete "$\lambda\_SIM$" and substitute -- $\lambda\_H\_SIM$ -- therefor.

In column 10, line 16: delete "$QS\_O_2\_AS = K \times QS\_L\_AS$" and substitute -- $QS\_O_2\_AS = k \times QS\_L\_AS$ -- therefor.

UNITED STATES PATENT AND TRADEMARK OFFICE
CERTIFICATE OF CORRECTION

PATENT NO. :  5,214,915
DATED      :  June 1, 1993
INVENTOR(S):  Erich Schneider and Eberhard Schnaibel It is certified that error appears in the above-identified patent and that said Letters Patent is hereby corrected as shown below:

In column 10, line 30: after "$\Delta\lambda$", insert -- ; --.

In column 10, line 51: delete "$\lambda_{13}ACT$" and substitute -- $\lambda\_H\_ACT$ -- therefor.

In column 10, line 56: delete "Lcapacity" and substitute -- capacity -- therefor.

In column 11, line 1: delete "deviative" and substitute -- deviation -- therefor.

In column 11, line 3: delete "deviative" and substitute -- deviation -- therefor.

In column 11, line 4: delete "dervative" and substitute -- deviation -- therefor.

In column 11, line 35: after "performance", insert -- loss of an --.

UNITED STATES PATENT AND TRADEMARK OFFICE
CERTIFICATE OF CORRECTION

PATENT NO.  : 5,214,915
DATED       : June 1, 1993
INVENTOR(S) : Erich Schneider and Eberhard Schnaibel It is certified that error appears in the above-identified patent and that said Letters Patent is hereby corrected as shown below:

In column 12, line 5: delete "derivative" and substitute -- deviation -- therefor.

In column 12, line 11: delete "flowing" and substitute -- flow -- therefor.

In column 12, line 12: before "from", insert -- flowing --.

In column 12, line 39: after "$SPV\_O_2$", insert -- in the --.

Signed and Sealed this

First Day of February, 1994

Attest:

BRUCE LEHMAN

Attesting Officer      Commissioner of Patents and Trademarks